United States Patent [19]
Cerro

[11] Patent Number: 6,095,038
[45] Date of Patent: Aug. 1, 2000

[54] EGG WHITE AND YOLK SEPARATOR

[76] Inventor: Matt Cerro, 15 Exeter Ct., Somerset, N.J. 08873

[21] Appl. No.: 09/266,375

[22] Filed: Mar. 11, 1999

[51] Int. Cl.$^7$ ................................. A23J 1/09; A47J 43/14
[52] U.S. Cl. .................................................. 99/499; 99/497
[58] Field of Search ..................... 99/490, 495, 496–500, 99/478–480; 220/4.03, 4.21, 630, 625; D7/665, 678

[56] References Cited

U.S. PATENT DOCUMENTS

| | | | |
|---|---|---|---|
| 1,759,512 | 5/1930 | Kramer et al. | 99/500 |
| 1,764,802 | 6/1930 | Mahlstedt | 99/500 |
| 2,212,328 | 8/1940 | Scurlock | 99/497 |
| 2,646,163 | 7/1953 | Sigler | 99/498 X |
| 2,720,232 | 10/1955 | Denton | 99/499 X |
| 3,749,001 | 7/1973 | Swett | 99/499 |
| 4,463,666 | 8/1984 | Papp | 99/495 X |
| 4,665,813 | 5/1987 | Maisonneuve | 99/568 X |
| 5,069,119 | 12/1991 | Idowu | 99/499 |
| 5,088,392 | 2/1992 | Ancona et al. | 99/499 |
| 5,438,919 | 8/1995 | Idowu | 99/499 |

*Primary Examiner*—Timothy Simone
*Attorney, Agent, or Firm*—Ezra Sutton

[57] ABSTRACT

An egg white and yolk separator for separating the egg yolk from the egg white of a broken egg shell of a whole egg. The egg white and yolk separator includes an egg yolk collector for collecting and holding a plurality of egg yolks therein, the collector having an upper surface with a plurality of spaced-apart, concave-shaped compartments formed in the upper surface for holding the yolks and egg whites of a whole egg, wherein each of the compartments includes a slit opening located at the bottom of each of the compartments for draining of egg whites through the slit openings. The egg white and yolk separator also includes an egg white receiving container under the collector for collecting egg whites drained from the slit openings in each of the compartments. The egg yolk collector further includes an egg shell breaking bar for breaking the egg shell of an egg to remove the contents of the egg into one of the concave-shaped compartments of the egg yolk collector, and an egg shell collection compartment for collecting egg shells of the broken eggs.

22 Claims, 4 Drawing Sheets

EGG WHITE AND YOLK SEPARATOR

FIELD OF THE INVENTION

The invention relates to an egg white and yolk separator device for the separating of the egg white from the yolk of an egg. More particularly, the separator device includes a plurality of concave-shaped compartments each having a slit in the bottom of each compartment, such that each of the egg yolks are held in each of the compartments while the egg white drains through each of the slits and is collected by a container underneath.

BACKGROUND OF THE INVENTION

The use of egg whites (albumen) for low cholesterol cooking is well known in the art. An egg consists of an egg shell, a yolk and egg white. Since egg white has a much lower cholesterol content than the yellow egg yolk portion, the egg white portion is often preferred as a food (egg white omelettes) or as a food ingredient by users wishing to limit their overall daily cholesterol intake. The egg yolk portion is usually discarded or used by the user's family for food or as an ingredient in their baking or other cooking needs (as these users are not concerned about their daily cholesterol intake).

Typically, the user manually breaks the egg shell with a knife or on the edge of a cup, a bowl or the like, where the user then uses the egg shell to retain the yolk therein, and the cup or bowl receives the separated egg white. The yolk is then put into another cup or bowl, or is possibly thrown away. Generally, this manual procedure of egg white and yolk separation is a tedious, messy and sloppy procedure, such that the egg white is not fully separated from the yolk or some of the egg white is not received within the cup or bowl as the egg white has spilled on the kitchen table, counter top, etc. In addition, the user during this procedure had used many utensils and containers in separating the egg white from the egg yolk.

There remains a need for a manual egg white and yolk separator which separates the egg white from the yolk of an egg in a one-step procedure. In addition, the separator should have only two component parts, a top egg yolk collector for breaking, separating and holding of the individual egg yolk, and a receiving receptacle (container) underneath the collector for receiving the egg whites.

DESCRIPTION OF THE PRIOR ART

Egg white and yolk separator apparatus and devices of various designs, configurations, structures and material of construction have been disclosed in the prior art. For example, U.S. Pat. No. 3,058,501 to KIRKLAND specifically discloses an egg separator for separating egg whites from egg yolks. A yolk cup catches the egg yolk, while the egg white passes through a central circular opening. A receptacle beneath the yolk cup collects the egg white.

U.S. Pat. No. 3,589,419 to CLASSEN discloses a machine for egg cracking and then separating the yolks from the egg whites. An egg separating cup is positioned beneath a cracking head and receives both the yolk and white. A yolk cup rests in and seals off an egg white draining aperture in the bottom of the egg white pan. When the egg white is to be drained, the lift surface of the cam raises the yolk cup, thus opening the aperture. The egg white is then fully drained and separated.

U.S. Pat. No. 3,749,001 to SWETT discloses an egg-separator that is adapted to separate the white from the yolk of an egg. The separator may be suspended from the edge of any bowl, dish, cup, etc. Thus, the user's hands can be free to crack the eggs over the separator. Slots are provided so that the separator can effectively be suspended over a bowl or dish.

U.S. Pat. No. 4,182,234 to REED teaches the use of a manually-operable machine for removing the contents of an egg without breaking the shell. Compressed air is forced into an egg by an air pump to displace both the yolk and white, which in turn is collected by a receptacle. The egg-contents are then received in a receptacle having a partition. The resulting two regions can be used to separate the yolks from the whites. This is because the air forced into the egg causes the egg white to be sucked out first, followed by the yolk. The user can manually place each region of the receptacle to separately collect the yolk and whites. This machine requires manual operation.

U.S. Pat. No. 4,463,666 to PAPP also discloses an egg-separator. The device is capable of separating the white and yolk of a plurality of eggs at once. A receptacle is provided with a bottom wall which slopes towards the center. There is a tubular hollow upright provided with spaced openings leading to a center discharge hole for the egg whites, while the yolks are held back at the openings. The user can crack an egg over the projection so that the yolk is held back while the egg white drains through the tubular upright and then eventually drains through several cutouts. The egg whites are then collected by a receptacle beneath the central opening of the tubular upright.

None of the aforementioned prior art patents teach or disclose the structure and design of the egg white and yolk separator of the present invention having a breaking and separating collector for multiple egg yolks and an egg white receiving container underneath the collector.

Accordingly, it is an object of the present invention to provide a manually operated, one-step egg white and yolk separator that includes only two components, a top yolk holding component being the breaking and separating egg yolk collector for holding multiple egg yolks, and an egg white receiving container for collecting multiple egg whites underneath the collector.

Another object of the present invention is to provide an egg white and yolk separator wherein the breaking and separating egg yolk collector includes a plurality of spaced-apart concave compartments positioned throughout the upper surface of the egg yolk collector, each having a slit opening at the bottom area of each compartment, such that the egg white s drain through each of the slit openings and the egg whites are collected by a receiving container which is located underneath the egg yolk collector.

Another object of the present invention is to provide an egg white and yolk separator wherein the egg yolk collector further includes additional features of an egg shell breaking bar, an egg shell collection compartment, a carrying handle for removing the egg yolk collector from the top of the egg white receiving container, and a removal spout for removing the collected egg yolks from the egg yolk collector.

Another object of the present is to provide an egg white and yolk separator made from moldable, heat-resistant, durable plastic or from formable, light-weight metals such as aluminum, copper, stainless steel, Teflon™-coated metals, cladded metals and the like.

Another object of the present invention is to provide an egg white and yolk separator that can be formed in various shapes, sizes and configurations such as cylindrically-shaped, rectangularly-shaped, cube-shaped, triangularly-shaped, oval-shaped, or other geometrically-shaped housings.

Another object of the present invention is to provide an egg white and yolk separator that is easy to use and clean, durable, light-weight, and easy to store-away after use.

A further object of the present invention is to provide an egg white and yolk separator that can be mass produced in an automated and economical manner and is readily affordable by the user.

SUMMARY OF THE INVENTION

The present invention provides for an egg white and yolk separator for separating the egg yolk from the egg white of an egg. The egg white and yolk separator includes an egg yolk collector for collecting and holding a plurality of egg yolks therein, the collector having an upper surface with a plurality of spaced-apart, concave-shaped compartments formed in the upper surface for holding the yolks and egg whites of a whole egg, wherein each of the compartments includes a slit opening located at the bottom of each of the compartments for draining of egg whites through the slit openings. The egg white and yolk separator also includes an egg white receiving container underneath the collector for collecting egg whites drained from the slit openings in each of the compartments.

The egg yolk collector further includes an egg shell breaking bar for breaking the egg shell of an egg to remove the contents of the egg into one of the concave-shaped compartments of the egg yolk collector, and an egg shell collection compartment for collecting of egg shells of the broken egg.

The egg yolk collector also includes a carrying handle for removing the egg yolk collector from the top of the egg white receiving container after the egg whites have drained from the slit openings of the collector; and a removal spout for removing the collected egg yolks of the broken and separated eggs from the upper surface of the collector.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED AND ALTERNATE EMBODIMENT

OVERVIEW

Figure 1:
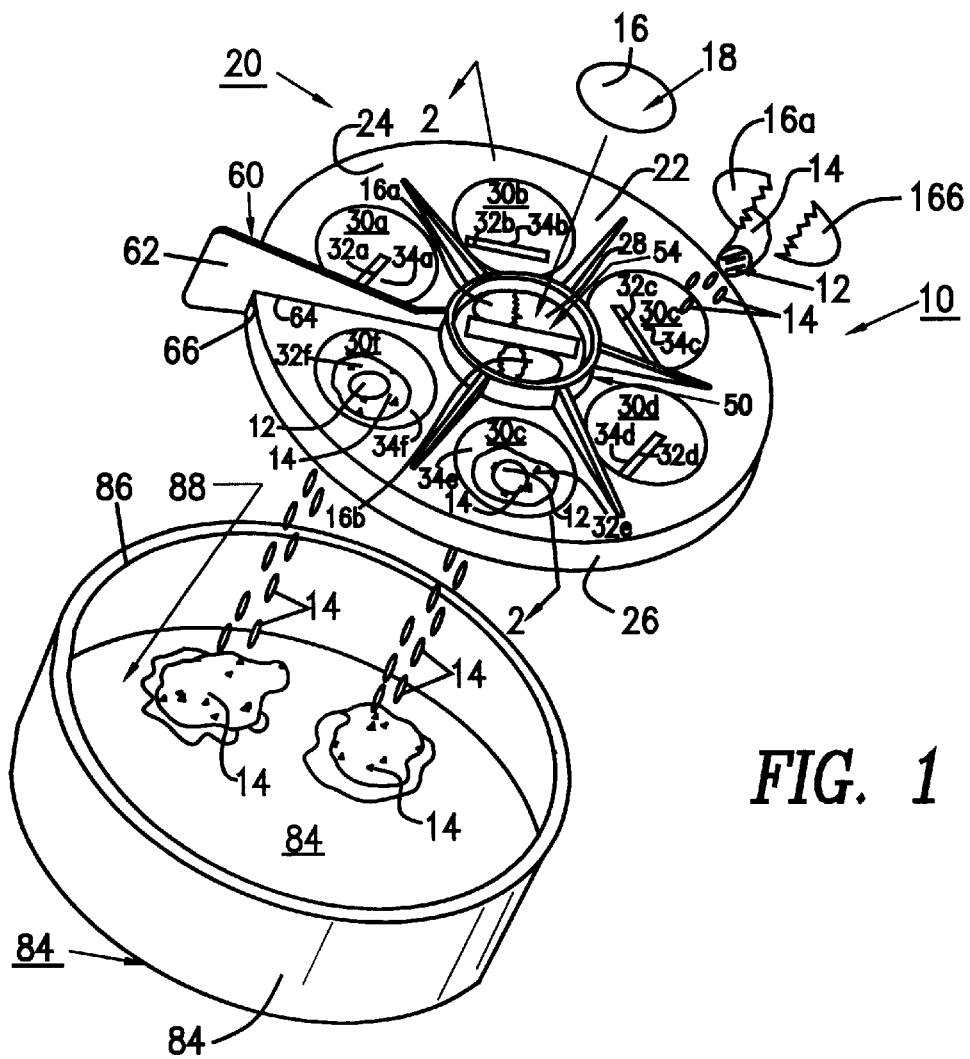
FIG. 1 is an exploded top front perspective view of the egg white and yolk separator of the preferred embodiment of the present invention showing the egg yolk collector having a plurality of evenly spaced-apart, concave-shaped compartments with rectangularly-shaped slit openings at the bottom area of each of the compartments, an egg shell breaking bar, a carrying handle, and an egg white receiving container.
Figure 2:
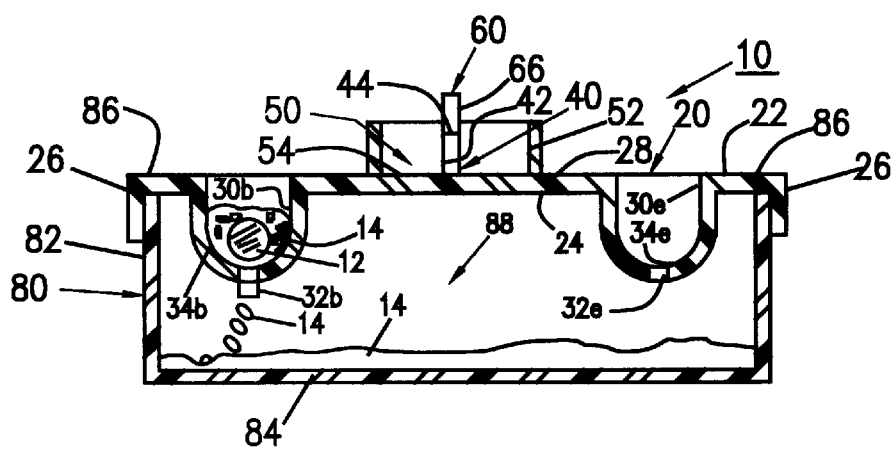
FIG. 2 is a cross-sectional view of the egg white and yolk separator of the preferred embodiment of the present invention taken along lines 2—2 of FIG. 1 showing the egg yolk collector and its component parts; and the egg white receiving container in the assembled state and in operational use.

The egg white and yolk separators 10, 100 and 200 and their component parts of the preferred and alternate embodiments of the present invention are represented in detail by FIGS. 1 through 7 of the patent drawings. The separators 10, 100 and 200 demonstrate the ability of the user to manually operate these devices to separate the egg yolks 12 from the egg whites 14 after breaking the egg shells 16 of whole eggs 18. The preferred embodiment of the egg white and yolk separator 10, as shown in FIGS. 1 and 2 of the drawings, includes a substantially cylindrical-shaped egg yolk collector 20 for collecting and holding a plurality of egg yolks 12 therein, and a substantially cylindrical-shaped egg white receiving container 80 for collecting egg whites 14. The egg white receiving container 80 is placed underneath the egg yolk collector 20 in order to collect draining egg whites 14 from the egg yolk collector 20.

Figure 3:
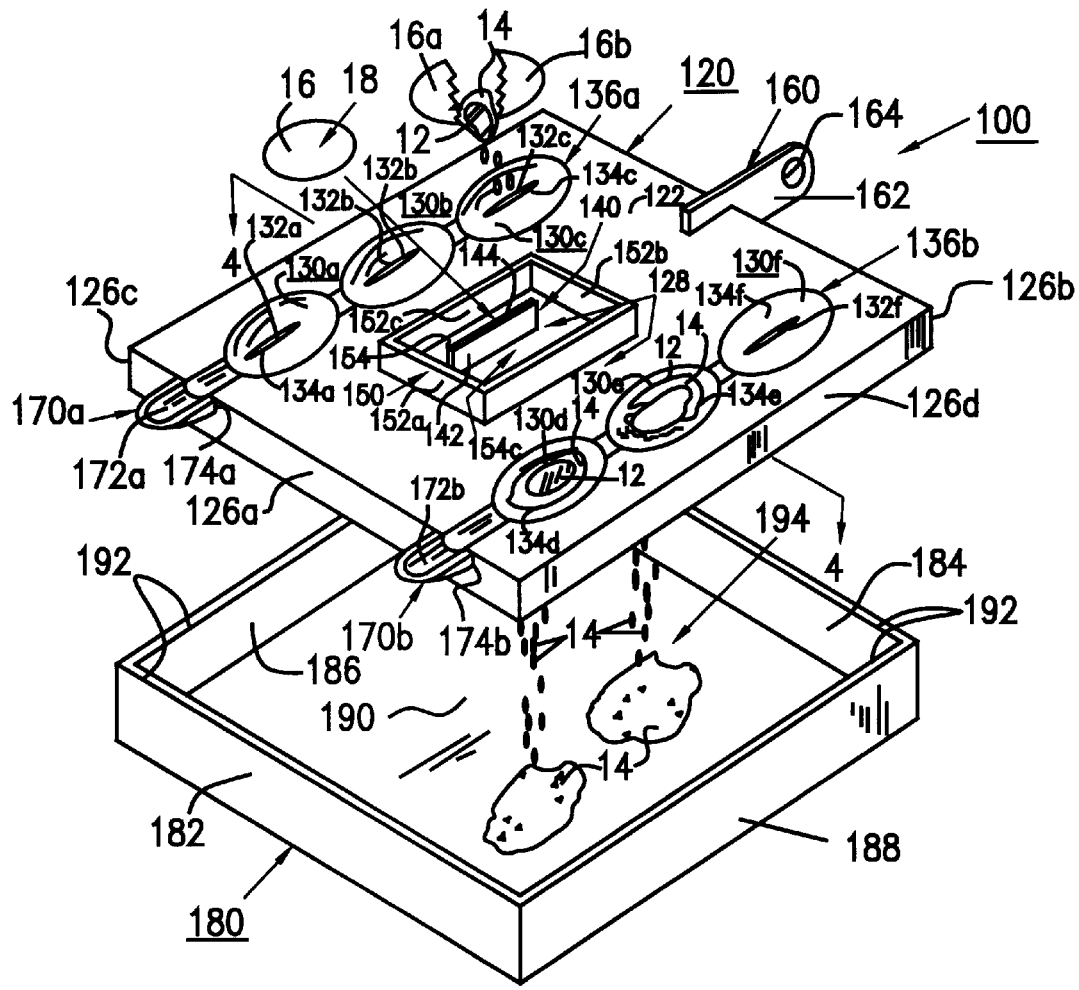
FIG. 3 is an exploded top front perspective view of the egg white and yolk separator of the first alternate embodiment of the present invention showing the egg yolk collector having a plurality of evenly spaced-apart, concave-shaped compartments with an elongated rectangularly-shaped slit opening at the bottom areas of each of the compartments, an egg shell breaking bar, a carrying handle, removal spouts, and an egg white receiving container.
Figure 4:
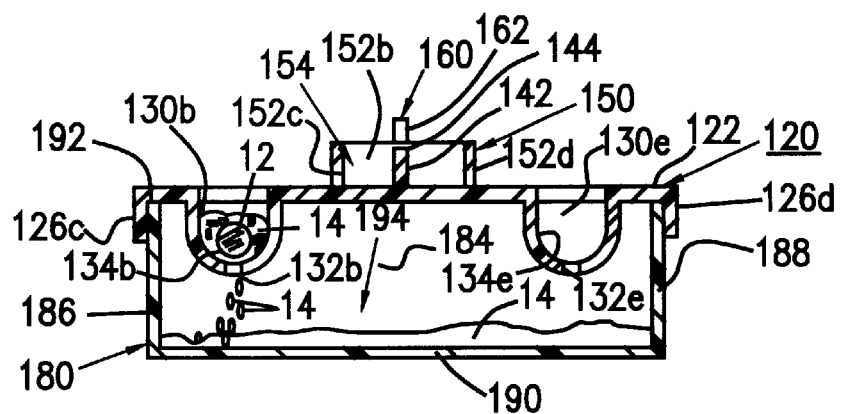
FIG. 4 is a cross-sectional view of the egg white and yolk separator of the first alternate embodiment of the present invention taken along lines 4—4 of FIG. 3 showing the egg yolk collector and its component parts; and the egg white receiving container in the assembled state and in operational use.

The first alternate embodiment of the egg white and yolk separator 100, as shown in FIGS. 3 and 4 of the drawings, includes a substantially square-shaped egg yolk collector 120 for collecting and holding a plurality of egg yolks 12 therein; and a substantially cube-shaped egg white receiving container 180 for collecting egg whites 14. The egg white receiving container 180 is placed underneath the egg yolk collector 120 in order to collect draining egg whites 14 from the egg yolk collector 120.

Figure 5:
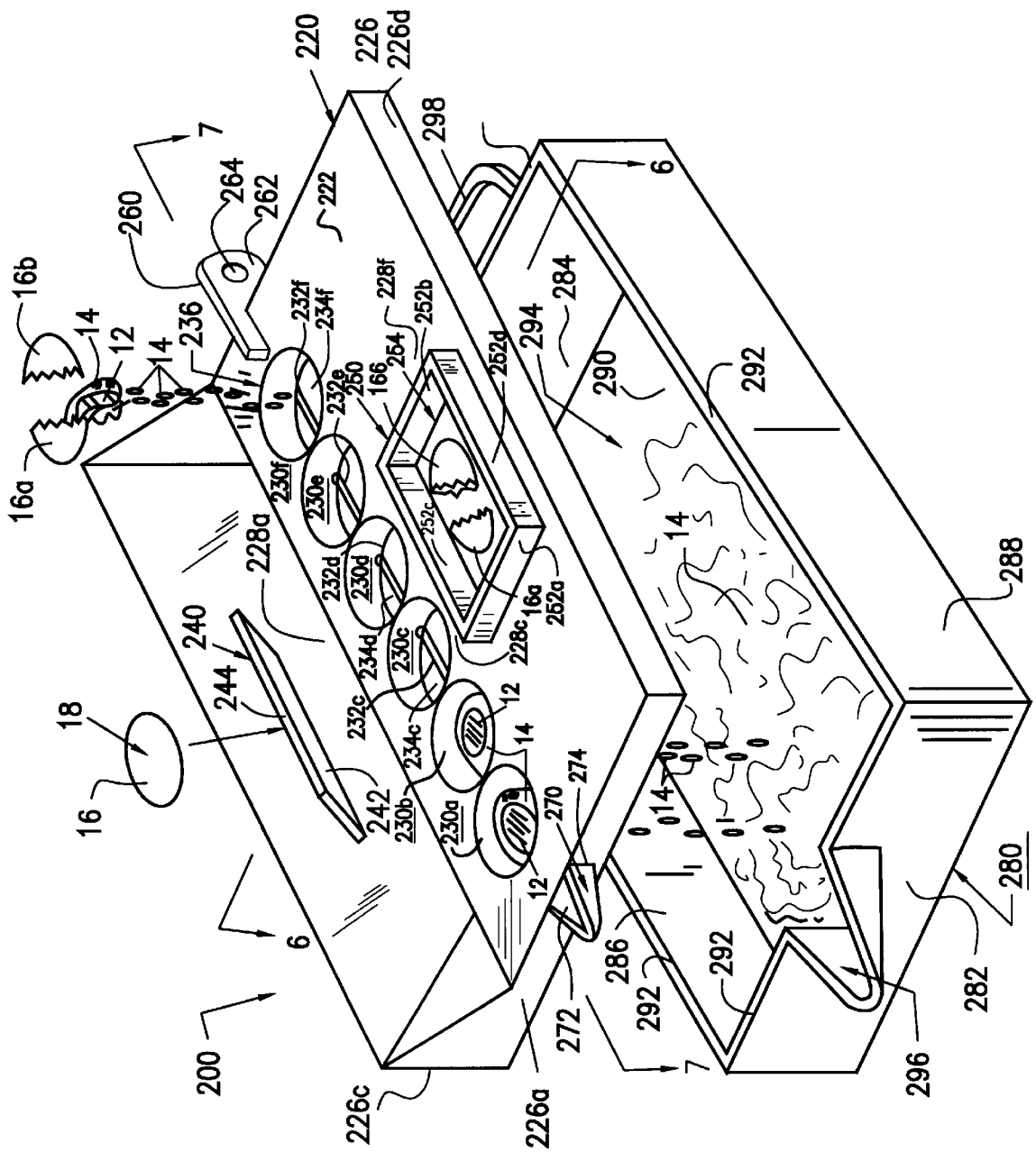
FIG. 5 is an exploded top front perspective view of the egg white and yolk separator of the second alternate embodiment of the present invention showing the egg yolk collector having a plurality of evenly spaced-apart, concave-shaped compartments with an elongated rectangularly-shaped slit opening at the bottom areas of each of the compartments, an egg shell breaking bar, a carrying handle, a removal spout, and an egg white receiving container.
Figure 7:
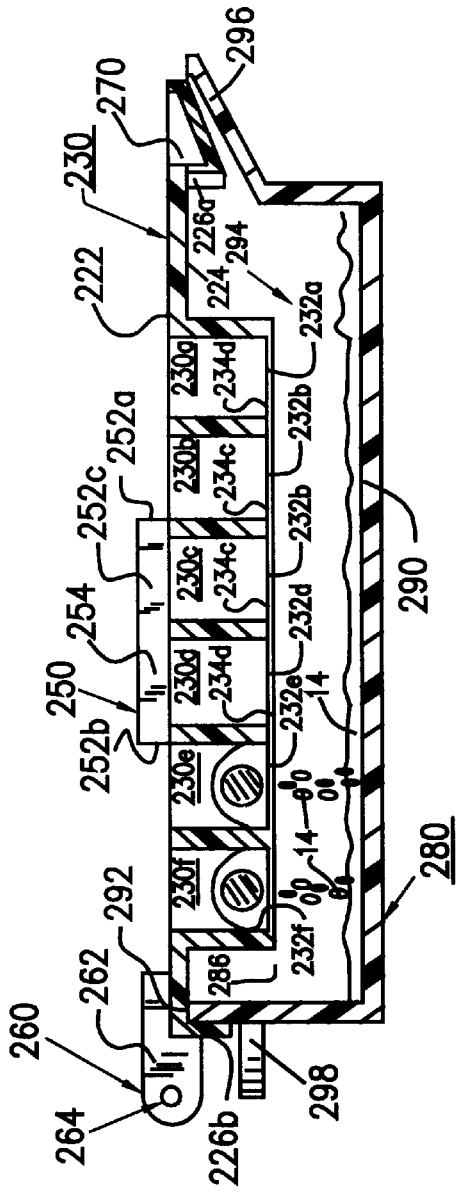
FIG. 7 is a cross-sectional view of the egg white and yolk separator of the second alternate embodiment of the present invention taken along lines 7—7 of FIG. 5 showing the egg yolk collector and its component parts; and the egg white receiving container in the assembled state and in operational use.

The second alternate embodiment of the egg white and yolk separator 200, as shown in FIGS. 5 and 7 of the drawings, includes a substantially rectangular-shaped egg yolk collector 220 for collecting and holding a plurality of egg yolks 12 therein; and a substantially rectangular-shaped egg white receiving container 280 for collecting egg whites 14. The egg white receiving container 280 is placed underneath the egg yolk collector 220 in order to collect draining egg whites 14 from the egg yolk collector 220.

In all other respects, the egg white and yolk separators 100 and 200 of the first and second alternate embodiments function and operate in the same manner as the egg white separator 10 of the preferred embodiment, except for the shape and configuration of each of the egg yolk collectors 20, 120 and 220 being different, and except for the shape and configuration of each of the egg white receiving containers 80, 180 and 280, being different, as depicted in FIGS. 1, 3 and 5 of the patent drawings.

PREFERRED EMBODIMENT 10

The egg white and yolk separator 10 and its component parts of the preferred embodiment of the present invention are represented in detail by FIGS. 1 and 2 of the patent drawings. The manually operated separator 10 includes an egg yolk collector 20 being substantially cylindrical in shape and an egg white receiving container 80 being also substantially cylindrical in shape. The egg yolk collector 20 is used for collecting and holding a plurality of egg yolks 12 therein. The egg white receiving container 80 is used for collecting egg whites 14, and is placed underneath the egg yolk collector 20 in order to collect draining egg whites 14 from the overhead positioned egg yolk collector 20. The egg yolk collector 20 and egg white receiving container 80 of separator 10 can be formed from moldable, heat resistant, durable plastic or can be made from formable, light-weight metals such as aluminum, copper, stainless steel, cladded metals or other Teflon™-coated metals.

The egg yolk collector 20, as depicted in FIGS. 1 and 2 of the drawings, includes an exterior upper or top surface 22, an interior bottom surface 24, a circular perimeter wall (rim) 26, and a center section 28 located on the upper surface 22 for the placement of the egg shell breaking bar 40 and the egg shell collection compartment 50 thereon. The egg yolk collector 20 further includes the upper surface 22 having a plurality of evenly spaced-apart, concave-shaped recesses or compartments 30a, 30b, 30c, 30d, 30e and 30f formed therein. Compartments 30a to 30f surround the egg shell collection compartment 50, as shown in FIG. 1 of the drawings, and each compartment 30a to 30f is semi-spherical in shape. Each of the concave-shaped compartments 30a to 30f are used for holding a yolk 12 and an egg white 14 (temporarily) of a whole egg 18, wherein each of the compartments 30a to 30f include a slit opening 32a, 32b, 32c, 32d, 32e and 32f, each being substantially rectangular in shape. Each of the slit openings 32a to 32f are located at each of the bottom sections 34a, 34b, 34c, 34d and 34f of each of the compartments 30a to 30f. These slit openings 32a to 32f are used for draining through of the egg whites 14 from the yolks 12 of the whole eggs 18 as the yolks 12 are contained within the bottom sections 34a to 34f of compartments 30a to 30f.

The egg yolk collector 20 also includes an egg shell breaking bar 40 for breaking the egg shell 16 of an egg 18 in order to remove the contents 12 and 14 (egg yolk and egg whites) of the whole egg 18 into one of the concave-shaped compartments 30a to 30f of the egg yolk collector 20. As shown in FIG. 1, the egg shell breaking bar 40 includes a rectangularly-shaped wall 42 having a slightly tapered breaking edge 44 for cracking the shell 16 of the whole egg 18. The breaking bar 40 is located within the center section 28 of the upper surface 22, and within the center 54c of the interior storage area 54 of the egg shell collection compartment 50.

In addition, the egg yolk collector 20, as shown in FIG. 1, includes an egg shell collection compartment 50 having a circular wall 52 for forming an interior storage area 54 for collecting the egg shells 16a and 16b of the broken egg 18 that are being discarded within the interior storage area 54 of the collection compartment 50. The collection compartment 50 is located within the center section 28 of the upper surface 22.

As shown in FIG. 1 of the drawings, the egg yolk collector 20 also includes a carrying handle 60 being substantially a rectangularly-shaped wall 62 for gripping by the hand of the user. The carrying handle 60 is used for removing the egg yolk collector 20 from the top circular perimeter edge 86 of the egg white receiving container 80 after all of the egg whites 14 have drained from the slit openings 32a to 32f of the compartments 30a to 30f of the egg yolk collector 20. The wall 62 is attached to the upper wall surface 22 and the perimeter wall 26 at attachment points 64 and 66, respectively, of egg yolk collector 20.

The egg white receiving container 80, as shown in FIGS. 1 and 2 of the drawings, includes a circular curved wall 82, a bottom wall 84 and an upper circular perimeter edge 86 for forming an interior storage area 88 in order to hold the drained egg whites 14. Receiving container 80 can also have the shape of a bowl in order to hold the drained egg whites 14.

FIRST ALTERNATE EMBODIMENT 100

The egg white and yolk separator 100 and its component parts of the first alternate embodiment of the present invention are represented in detail by FIGS. 3 and 4 of the patent drawings. The manually operated separator 100 includes an egg yolk collector 120 being substantially square in shape and an egg white receiving container 180 being also substantially cubical in shape. The egg yolk collector 120 is used for collecting and holding a plurality of egg yolks 12 therein. The egg white receiving container 180 is used for collecting egg whites 14, and is placed underneath the egg yolk collector 120 in order to collect draining egg whites 14 from the overhead positioned egg yolk collector 120. The egg yolk collector 120 and egg white receiving container 180 of separator 10 can be formed from moldable, heat resistant, durable plastic or can be made from formable, light-weight metals such as aluminum, copper, stainless steel, cladded metals, or other Teflon™-coated metals.

The egg yolk collector 120, as depicted in FIGS. 3 and 4 of the drawings, includes an exterior upper or top surface 122, an interior bottom surface 124, side walls 126a, 126b, 126c and 126d, and a center section 128 located on the upper surface 122 for the placement of the egg shell breaking bar 140 and the egg shell collection compartment 150 thereon. The egg yolk collector 120 further includes the upper surface 122 having a plurality of evenly spaced-apart, concave-shaped recesses or compartments 130a, 130b, 130c, 130d, 130e and 130f formed therein. Compartments 130a to 130f are formed into two (2) rows 136a and 136b; where row 136a includes compartments 130a, 130b and 130c, and row 136b includes compartments 130c, 130d and 130f, respectively, thereon. Rows 136a and 136b are on each side of the rectangular-shaped egg shell collection compartment 150, as shown in FIG. 3 of the drawings. Each of the concave-shaped (recessed) compartments 130a to 130f are semi-ellipsoidal in shape. Each of the concave-shaped compartments 130a to 130f are used for holding a yolk 12 and an egg white 14 (temporarily) of a whole egg 18, wherein each of the compartments 130a to 130f include a slit opening 132a, 132b, 132c, 132d, 132e and 132f each being substantially elliptical in shape, as shown in FIG. 3 of the drawings. Each of the slit openings 132a to 132f are located at each of the bottom sections 134a, 134b, 134c, 134d and 134f of each of the compartments 130a to 130f. These slit openings 132a to 132f are used for draining through of the egg whites 14 from the yolks 12 of the whole egg 18, as the yolks 12 as contained within the bottom sections 134a to 134f of compartments 130a to 130f.

The egg yolk collector 120 also includes an egg shell breaking bar 140 for breaking the egg shell 16 of an egg 18 in order to remove the contents 12 and 14 (egg yolk and egg whites) of the whole egg 18 into one of the concave-shaped compartments 130a to 130f of the egg yolk collector 20. As shown in FIG. 3, the egg shell breaking bar 140 includes a rectangularly-shaped wall 142 having a slightly tapered breaking edge 144 for cracking the shell 16 of the whole egg 18. The breaking bar 140 is located within the center section 128 of the upper surface 122, and within the center 154c of the interior storage area 154 of the egg shell collection compartment 150.

In addition, the egg yolk collector 120, as shown in FIG. 3, includes an egg shell collection compartment 150 being rectangular in shape having a front wall 152a, a rear wall 152b, and side walls 152c and 152d for forming an interior storage area 154 for collecting the egg shells 16a and 16b of the broken egg 18 that are being discarded within the interior storage area 154 of the collection compartment 150. The collection compartment 150 is located within the center section 128 of the upper surface 122 of the egg yolk collector 120.

As shown in FIGS. 3 and 4 of the drawings, the egg yolk collector 120 also includes a carrying handle 160 being substantially an oval-shaped wall 162 for gripping by the hand of the user and having a hole opening 164 for hanging the collector 120 on a hook (not shown). The carrying handle 160 is used for removing the egg yolk collector 120 from the top rectangular perimeter edge 192 of the egg white receiving container 180 after all of the egg whites 14 have drained from the slit openings 132a to 132f of the compartments 130a to 130f of the egg yolk collector 120. The handle wall 162 is attached at the center point 166 of rear wall 126b of the egg yolk collector 120, as shown in FIG. 4 of the drawings.

Additionally, the egg yolk collector 120 also includes a pair of removal spouts 170a and 170b each having a tapered and concave conical wall 172a and 172b, respectively, for removing the one or more collected egg yolks 12 from each of rows 136a and 136b, as shown in FIGS. 3 and 4 of the drawings. Removal spouts 170a and 170b are attached to the front wall 126a of the egg yolk collector 120 at attachment points 174a and 174b, respectively.

The egg white receiving container 180, as shown in FIGS. 3 and 4 of the drawings, being substantially cubed-shaped includes a front wall 182, a rear wall 184, side walls 186 and 188, a bottom wall 190, and a square upper perimeter edge 192 for forming an interior storage area 194 for collecting the drained egg whites 14 from the slit openings 132a to 132f of compartments 130a to 130f of collector 120.

SECOND ALTERNATE EMBODIMENT 200

Figure 6:
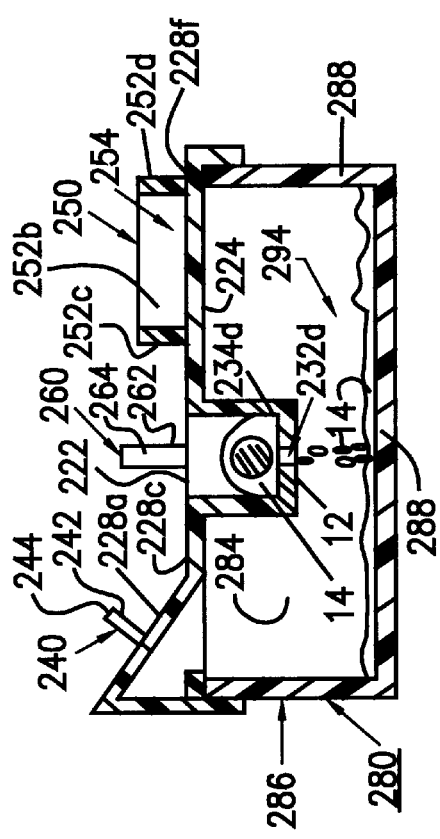
FIG. 6 is a cross-sectional view of the egg white and yolk separator of the second alternate embodiment of the present invention taken along lines 6—6 of FIG. 5 showing the egg yolk collector and its component parts; and the egg white receiving container in the assembled state and in operational use.

The egg white and yolk separator 200 and its component parts of the second alternate embodiment of the present invention are represented in detail by FIGS. 5 to 7 of the patent drawings. The manually operated separator device 200 includes an egg yolk collector 220 being substantially rectangular in shape and an egg white receiving container 280 being also substantially rectangular in shape. The egg yolk collector 220 is used for collecting and holding a plurality of egg yolks 12 therein. The egg white receiving container 280 is used for collecting egg whites 14, is placed underneath the egg yolk collector 220 in order to collect draining egg whites 14 from the overhead positioned egg yolk collector 220. The egg yolk collector 220 and egg white receiving container 280 of separator 200 can be formed from moldable, heat resistant, durable plastic or can be made from formable, light-weight metals such as aluminum, copper, stainless steel, cladded metals or other Teflon™-coated metals.

The egg yolk collector 220, as depicted in FIGS. 5, 6 and 7 of the drawings, includes an exterior upper or top surface 222, an interior bottom surface 224, side walls 226a, 226b, 226c and 226d. The egg yolk collector 220 also includes an angled section 228a, a flat section 228f and a center section 228c all being located on the upper surface 222 for the placement of the egg shell breaking bar 240 within the angled section 228a and the egg shell collection compartment 250 within the flat section 228f. The egg yolk collector 220 further includes the upper wall surface 222 having a plurality of evenly spaced-apart, cup-shaped compartments 230a, 230b, 230c, 230d, 230e and 230f formed therein. Compartments 230a to 230f are formed into a single row 236 within the center section 228c of the upper surface 222 of collector 220, as shown in FIG. of the drawings. Each of the cup-shaped compartments 230a to 230f are ellipsoidal (oval) in shape, but can also be circular, square, rectangular in shape. Each of the cup-shaped compartments 230a to 230f are used for holding an egg yolk 12 and an egg white 14 (temporarily) of a whole egg 18, wherein each of the compartments 230a to 230f include a single elongated slit opening 232 being substantially rectangular in shape, as shown in FIGS. 5 and 6 of the drawings. The slit opening 232 is located throughout the bottom sections 234a, 234b, 234c, 234d and 234f of each compartments 230a to 230f. The single slit opening 232 is used for draining through of the egg whites 14 from the yolks 12 of the whole egg 18, as the yolks 12 are contained within each of the bottom section areas 234a to 234f of compartments 230a to 230f.

The egg yolk collector 220 also includes an egg shell breaking bar 240 for breaking the egg shell 16 of an egg 18 in order to remove the contents 12 and 14 (egg yolk and egg whites) of the whole egg 18 into one of the cup-shaped compartments 230a to 230f of the egg yolk collector 120. As shown in FIG. 5, the egg shell breaking bar 240 includes a rectangularly-shaped wall 242 having a slightly tapered breaking edge 244 for cracking the shell 16 of the whole egg 18. The breaking bar 240 is located centrally within the angled section 228a of the upper surface 222.

In addition, the egg yolk collector 220, as shown in FIG. 5, includes an egg shell collection compartment 250 being rectangular in shape having a front wall 252a, a rear wall 252b, and side walls 252c and 252d for forming an interior storage area 254 for collecting the egg shells 16a and 16b of the broken egg 18 that are being discarded within the interior storage area 254 of the collection compartment 250. The collection compartment 250 is located centrally within the flat section 228f of the upper surface 222 of the egg yolk collector 220.

As shown in FIGS. 5 and 6 of the drawings, the egg yolk collector 220 also includes a carrying handle 260 being substantially an oval-shaped wall 262 for gripping by the hand of the user and having a hole opening 264 for hanging the collector 220 on a hook (not shown). The carrying handle 260 is used for removing of the egg yolk collector 220 from the top rectangular perimeter edge 292 of the egg white receiving container 280 after all of the egg whites 14 have drained from the slit openings 232a to 232f of the compartments 230a to 230f of the egg yolk collector 220. The handle wall 262 is attached at the center point 266 of rear wall 226b of the egg yolk collector 220, as shown in FIG. 6 of the drawings.

Additionally, the egg yolk collector 220 also includes a removal spout 270 having a tapered and concave conical wall 272 for removing one or more collected egg yolk portions 12 from row 236, as shown in FIGS. 5 and 7 of the drawings. Removal spout 270 is centrally attached to the front wall 226a of the egg yolk collector 220 at attachment point 274.

The egg white receiving container 280, as shown in FIGS. 5, 6 and 7 of the drawings, being substantially rectangular-shaped includes a front wall 282, a rear wall 284, side walls 286 and 288, a bottom wall 290, and a rectangular upper perimeter edge 292 for forming an interior storage area 294 for collecting the drained egg whites 14 from the slit openings 232a to 232f of compartments 230a to 230f of collector 220. In addition, container 280 includes an egg white removal spout 296 centrally located on the front wall 282 adjacent to the upper perimeter edge 292. Container 280 also includes an egg white carrying handle 298 being substantially rectangular in shape. Carrying handle 298 is located on the rear wall 284 adjacent to the upper perimeter edge 292, as depicted in FIG. 5 of the drawings.

OPERATION OF THE PRESENT INVENTION

The operational use of the egg white and yolk separators 10, 100 and 200 of the preferred and alternate embodiments of the present invention are all manually operated in a similar manner, as shown in FIGS. 1 to 7 of the drawings, except for using the removal spout(s) 170a and 170b and 270 of the first and second alternate embodiments, respectively. There is no removal spout attached to collector 20 in the preferred embodiment In using separators 10, 100 and 200, the first step is to place the egg yolk collectors 20, 120 and 220 on the upper perimeter edges 86, 192 and 292 of the egg white receiving containers 80, 180 and 280, respectively. The user is now ready to break the egg shells 16 of one or more whole eggs 18 in order to separate the egg yolks 12 from the egg whites 14. In doing this function, the user breaks the egg shells 16 by cracking the whole egg 18 on the tapered breaking edges 44, 144 and 244 of the egg shell breaking bars 40, 140 and 240, respectively. The user then places the contents 12 and 14 (egg yolk and egg whites) of the whole egg 18 into one of the compartments 30a to 30f, 130a to 130f, and 230a to 230f, respectively. The user then discards the egg shells 16a and 16b into the interior storage areas 54, 154 and 254 of the egg shell collection compartments 50, 150 and 250, respectively. The above mentioned steps of breaking the egg 18 via breaking bars 40, 140 and 240, placing the egg contents 12 and 14 into a single compartment (i.e.) 30a, 130a and 230a, and discarding the egg shells 16a and 16b into an egg shell collection compartment 50, 150 and 250, are again repeated as necessary for more eggs 18, if the user desires.

The plurality of one or more egg contents 12 and 14 are now within each of the compartments 30a to 30f, 130a to 130f, and 230a to 230f. The slit openings 32a to 32f, 132a to 132f, and 232 allow the egg whites 14 to drain through the bottom sections 34a to 34f, 134a to 134f, and 234a to 234f of compartments 30a to 30f, 130a to 130f and 230a to 230f, respectively. This aforementioned step allows the egg yolks 12 to remain within each of the compartments 30a to 30f, 130a to 130f, and 230a to 230f, respectively, and lets the egg whites fully drain into the egg white receiving containers 80, 180 and 280, respectively.

The user can now store or discard the remaining egg yolks 12 that are contained within the egg yolk collectors 20, 120 and 220, respectively. In using the collectors 20, 120 and 220, the user lifts the carrying handles 60, 160 and 260 to remove the collectors 20, 120 and 220 from the top perimeter edges 86, 192 and 292 of egg white receiving containers 80, 180 and 280, respectively. The user can then tilt the collectors 20, 120 and 220 downwardly to let the egg yolks 12 slide away from their respective compartments 30a to 30f, 130a to 130f and 230a to 230f into a bowl, a container or a sink, respectively. The egg yolk 12 removal is done more effectively in the first and second alternate embodiments 100 and 200 using the removal spouts 170a and 170b, and 270 on collectors 120 and 220, respectively, as the egg yolks 12 slide down these aforementioned removal spouts in an easy and effective manner, as shown in FIGS. 3 and 5 of the drawings. The remaining drained egg whites 14 within containers 80, 180 and 280, respectively, are now ready for further food processing as needed by the user.

The separators 10, 100 and 200 can now be hand washed or cleaned in a dishwasher, as these devices are dishwasher safe, and are ready again for future use.

ADVANTAGES OF THE PRESENT INVENTION

Accordingly, an advantage of the present invention is that it provides for a manually operated, one-step egg white and yolk separator that includes only two components, a top yolk holding component being the breaking and separating egg yolk collector for holding multiple egg yolks, and an egg white receiving container for collecting multiple egg whites underneath the collector.

Another advantage of the present invention is that it provides for an egg white and yolk separator wherein the breaking and separating egg yolk collector component includes a plurality of spaced-apart concave compartments positioned throughout the upper surface of the egg yolk collector, each having a slit opening at the bottom area of each compartment, such that the egg whites drain through each of the slit openings and the egg whites are collected by a receiving container which is located underneath the egg yolk collector.

Another advantage of the present invention is that it provides for an egg white and yolk separator wherein the egg yolk collector further includes additional features of an egg shell breaking bar, an egg shell collection compartment, a carrying handle for removing the egg yolk collector from the top of the egg white receiving container, and a removal spout for removing the collected egg yolks from the egg yolk collector.

Another advantage of the present is that it provides for an egg white and yolk separator made from moldable, heat-resistant, durable plastic or from formable, light-weight metals such as aluminum, copper, stainless steel, Teflon™-coated metals, and the like.

Another advantage of the present invention is that it provides for an egg white and yolk separator that can be formed in various shapes, sizes and configurations such as cylindrically-shaped, rectangularly-shaped, cube-shaped, triangularly-shaped, oval-shaped, or other geometrically-shaped housings.

Another advantage of the present invention is that it provides for an egg white and yolk separator that is easy to use and clean, durable, light-weight, and easy to store-away after use.

A further advantage of the present invention is that it provides for an egg white and yolk separator that can be mass produced in an automated and economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An egg white and yolk separator for separating the egg yolk from the egg white of a broken egg shell of a whole egg, comprising:
   a) an egg yolk collector for collecting and holding a plurality of egg yolks therein, said collector including an upper surface having a plurality of spaced-apart, concave-shaped compartments formed in said upper surface for holding the yolks and egg whites of a whole egg, wherein each of said compartments having a slit opening located at the bottom of each of said compartments for draining of egg whites from the yolks through said slit openings; and
   b) an egg white receiving container located below said egg yolk collector for collecting egg whites drained from said slit openings in each of said compartments.

2. An egg white and yolk separator in accordance with claim 1, wherein said compartments are arranged in a circular array.

3. An egg white and yolk separator in accordance with claim 1, wherein said compartments are arranged in a linear array.

4. An egg white and yolk separator in accordance with claim 1, wherein said egg yolk collector further includes an egg shell breaking bar for breaking the egg shell of an egg in order to remove the contents of the egg into one of said concave-shaped compartments of said egg yolk collector.

5. An egg white and yolk separator in accordance with claim 1, wherein said egg yolk collector further includes an egg shell collection compartment for collecting egg shells of broken eggs.

6. An egg white and yolk separator in accordance with claim 1, wherein said egg yolk collector further includes a carrying handle for removing said collector from the top of said egg white receiving container after the egg whites have drained from said slit openings of said collector.

7. An egg white and yolk separator in accordance with claim 1, wherein said egg yolk collector further includes a removal spout for removing the one or more collected egg yolks from said upper surface of said collector.

8. An egg white and yolk separator in accordance with claim 1, wherein each of said concave-shaped compartments is semi-spherical or semi-ellipsoidal in shape.

9. An egg white and yolk separator in accordance with claim 1, wherein each of said slit openings has an elongated rectangular-shape or an elongated elliptical shape.

10. An egg white and yolk separator in accordance with claim 1, wherein said separator is formed from moldable, heat resistant, durable plastic or from formable, light-weight metals such as aluminum, copper, stainless steel, cladded metals or other Teflon™-coated metals.

11. An egg white and yolk separator in accordance with claim 1, wherein said separator has a shape selected from the group consisting of cylindrical-shaped, cube-shaped, rectangularly-shaped, triangularly-shaped and oval-shaped.

12. An egg white and yolk separator for separating the egg yolk from the egg white of a broken egg shell of a whole egg, comprising:
   a) an egg yolk collector for collecting and holding a plurality of egg yolks therein, said collector including an upper surface having a plurality of spaced-apart, cup-shaped compartments formed in said upper surface for holding the yolks and egg whites of a whole egg, wherein each of said compartments having a slit opening located at the bottom of each of said compartments for draining of egg whites from the yolks through said slit openings;
   b) wherein each of said slit openings at the bottom of each of said compartments are connected to form a continuous and elongated slit opening connecting all of said compartments; and
   c) an egg white receiving container for collecting egg whites drained from said slit openings in each of said compartments.

13. An egg white and yolk separator in accordance with claim 12, wherein said compartments are arranged in a circular array.

14. An egg white and yolk separator in accordance with claim 12, wherein said compartments are arranged in a linear array.

15. An egg white and yolk separator in accordance with claim 12, wherein said continuous and elongated slit opening is rectangularly-shaped.

16. An egg white and yolk separator in accordance with claim 12, wherein said egg yolk collector further includes an egg shell breaking bar for breaking the egg shell of an egg in order to remove the contents of the egg into one of said concave-shaped compartments of said collector.

17. An egg white and yolk separator in accordance with claim 12, wherein said egg yolk collector further includes an egg shell collection compartment for collecting egg shells of broken eggs.

18. An egg white and yolk separator in accordance with claim 12, wherein said egg yolk collector further includes a carrying handle for removing said collector from the top of said egg white receiving container after the egg whites have drained from said slit openings of said collector.

19. An egg white and yolk separator in accordance with claim 12, wherein said egg yolk collector further includes a removal spout for removing the one or more collected egg yolks from said upper surface of said collector.

20. An egg white and yolk separator in accordance with claim 12, wherein each of said cup-shaped compartments is circular, oval, square or rectangular in shape.

21. An egg white and yolk separator in accordance with claim 12, wherein said separator is formed from moldable, heat resistant, durable plastic or from formable, light-weight metals such as aluminum, copper, stainless steel, cladded metals or other Teflon™-coated metals.

22. An egg white and yolk separator in accordance with claim 12, wherein said separator has a shape selected from the group consisting of cylindrical-shaped, cube-shaped, rectangularly-shaped, triangularly-shaped and oval-shaped.

* * * * *